(12) United States Patent
Allegretti

(10) Patent No.: US 7,398,085 B2
(45) Date of Patent: Jul. 8, 2008

(54) TELECOMMUNICATIONS AND TELEPHONY NETWORK

(75) Inventor: Claudio Allegretti, Pavia (IT)

(73) Assignee: Technolux Holding S.A., Aldringen (LU)

( * ) Notice: Subject to any disclaimer, the term of this patent is extended or adjusted under 35 U.S.C. 154(b) by 0 days.

(21) Appl. No.: 10/523,890

(22) PCT Filed: Aug. 8, 2002

(86) PCT No.: PCT/IB02/03113

§ 371 (c)(1),
(2), (4) Date: Feb. 4, 2005

(87) PCT Pub. No.: WO2004/016004

PCT Pub. Date: Feb. 19, 2004

(65) Prior Publication Data

US 2006/0089139 A1    Apr. 27, 2006

(51) Int. Cl.
*H04Q 7/20* (2006.01)
(52) U.S. Cl. .................................. 455/424; 455/422.1
(58) Field of Classification Search ............ 455/426.1, 455/426.2, 552.1, 554.2, 555, 554.1, 556.1, 455/556.2, 557, 427, 428, 14, 15, 414.2, 455/424, 422.1; 370/352
See application file for complete search history.

(56) References Cited

U.S. PATENT DOCUMENTS 5,839,053 A * 11/1998 Bosch et al. ............... 455/13.1

| | | | |
|---|---|---|---|
| 6,233,463 B1 * | 5/2001 | Wiedeman et al. | ....... 455/552.1 |
| 6,954,454 B1 * | 10/2005 | Schuster et al. | ............. 370/352 |
| 2002/0057097 A1 * | 5/2002 | Kelly et al. | .................. 324/700 |
| 2004/0166843 A1 * | 8/2004 | Hahn | ...................... 455/426.2 |

FOREIGN PATENT DOCUMENTS

| EP | 0812085 | 12/1996 |
|---|---|---|
| EP | 0 812 085 | 12/1997 |
| EP | 1 117 214 | 7/2001 |
| EP | 1117214 A2 | 7/2001 |
| WO | WO 99/35811 | 7/1999 |
| WO | WO 99 35811 | 7/1999 |
| WO | WO 2004/016004 | 9/2003 |

* cited by examiner

*Primary Examiner*—Duc Nguyen
*Assistant Examiner*—Eric J Elcenko
(74) *Attorney, Agent, or Firm*—James V. Costigan; Hedman & Costigan, P.C.

(57) ABSTRACT

An integrated telecommunications and telephony network (AT), which is independent from the conventional service companies, and can guarantee global connectivity (geographical, vocal, data, fax, video, points of access for dedicated mobile devices, Internet access) between users of the same network as well as with users of networks which belong to other mobile or fixed telephony service companies, comprising a network structure which is controlled in accordance with an IP protocol (Internet Protocol), which guarantees the connectivity between the different local exchanges (CL) and local residents' exchanges, whereas at local level the user has standard telephone numeration available in order to access the service; the local user accesses the local exchanges (CL) by means of bi-directional satellite stations and/or sites.

7 Claims, 4 Drawing Sheets

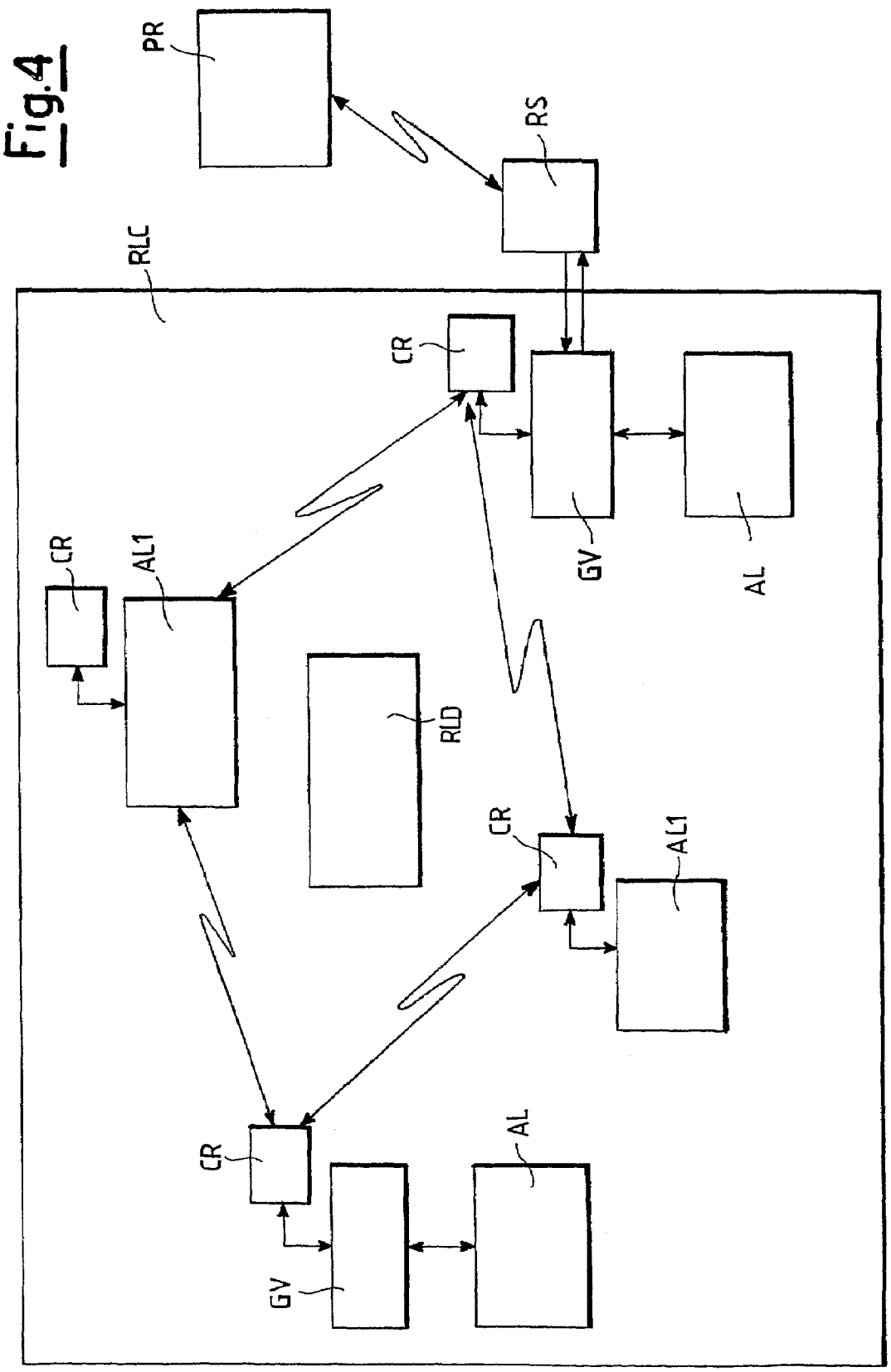

TELECOMMUNICATIONS AND TELEPHONY NETWORK

The present invention relates to an integrated telecommunications and telephony network, and in particular to an integrated video telephony, telephony, data transmission and Internet network, by means of bidirectional satellite stations/sites.

More specifically, the method for satellite transport of a bidirectional type according to the invention uses the IP protocol and is applicable to two types of networks:

1) "Full-mesh network, by means of which each user terminal can be connected to any other terminal by means of a single satellite jump (first terminal—satellite—second terminal) and in which the user terminals which are associated with this "full-mesh network" are grouped into a "Virtual Private Network";
2) "Star network", which is used to connect user terminals and can be connected to any other terminal by means of a double satellite jump (first terminal—satellite—centralised satellite hub—satellite—second terminal) and in which, in this network configuration also, the user terminals are grouped into a "Virtual Private Network".

It can thus be seen that it is possible to connect in a bidirectional manner user terminals which are located in any part of the world by means of satellite connections, without having to use any longer the land connection known as the "last mile".

For the purposes of the invention, in the present description, user terminals complete with a satellite antenna must also be considered to be all the embodiments implemented on mobile means such as motorised or towed mobile land vehicles, ships and aircraft (in these last two cases use will also be made of automatically aimed antennae which are stabilised on three axes).

Finally, in terms of band, there is a range from 64 Kbit/s to 34 Mbit/s and the services which are supported can consist of various major applications, such as video conferences, video telephony, compressed-mode telephony, data transmission and accessibility to the Internet network.

The normal telecommunications systems which are currently operative for fixed telephony briefly include the following: a physical system for collection from the client to the first switching exchange, a series of systems for distribution of the physical connections between the client and the exchange, such as, for example, to assure prompt determination of faulty cables, and interchangeability of the utterances of the client in relation to the exchange, a series of switching systems, and the transport systems.

However, the traffic is always collected by means of physical connections, which usually include copper carrier cables leading from the location of the client to the first switching location (exchange).

Similarly, the transport systems also use carriers which are made of copper, or use radio bridges with a carrier frequency, or with optical fibres.

Thus, in the conventional telecommunications systems for public use, in order to allow broad-band services to reach the location of the client, it is necessary to use optical fibres or physical cables of a balanced or coaxial type; furthermore, the transport by radio is always carried out with fixed-carrier consolidated technologies.

In addition, as far as GSM telephony systems in particular are concerned, in relation to so-called international roaming, the present situation is particularly critical, especially from the point of view of the operators, since, firstly, no operator can have direct control over costs incurred by the client during roaming conversations; this limits considerably the inputs of any telephone operator.

In addition, it is not possible for the operators themselves to offer pre-paid cards to clients who make roaming telephone calls.

Finally, the telephone costs of these conversations are always too expensive for the clients, and it is also extremely difficult to access the various voice-mail facilities activated by the users.

Within the context of the requirements previously described, the object of the present invention is to eliminate the aforementioned disadvantages, by providing a telecommunications and telephony network which guarantees geographical connection, bidirectional satellite loop, or connection of the "last mile", points of access for dedicated mobile devices, global connectivity between the users of the same network, as well as with users of networks which belong to other mobile or fixed telephony service companies, and integrated connectivity with connections of a satellite type.

The technological innovation of the present invention in comparison with the existing systems which use satellite routers is to permit transparent transport of data flows (for example of type E1 at 2 Mbit/s with a G.703/G.704 interface) which are not oriented to the connection by means of satellite routers, which are necessarily oriented to the connection.

This makes it possible to transport transparently the so-called junction connections, comprising in the data flow both the signals between the network nodes and the voice frames between the public telephone switching exchanges at any hierarchical network level, base radio stations and corresponding control stations for mobile telephony systems and private (PBX) and public switching exchanges.

Thus, owing to the numerable E1 interfaces present on the satellite router, the connection can be of the point-to-point type rather than of the point-to-muilti-point type, with considerable advantages in terms of economy of scale.

Specific applications of this technological innovation with satellite connectivity are associated both with use for TETRA Base Stations (TBS), with the Digital Exchange systems (DXT) of the TETRA network, and with the networks (GSM) between the Radio Base Station (RBS) and the corresponding Base Station Control (BSC); further applications include data transport on standard UMTS and MMS networks.

In these applications the flows at 2 Mbit/s of the E1 type with a structured G.703/G.704 interface are transported in bidirectional mode.

In practice the technological innovation is based on a satellite router of which both the software and hardware have been modified correspondingly, which permits transparent transport of the data flows to be joined to the router itself in transmission and in reception; the idea is to provide by means of bidirectional satellite connection the possibility of transporting the data flows with speeds of between 2 Mbit/s and 34 Mbit/s for the interconnection of public and private switching systems.

Another object of the present invention is to provide an integrated telecommunications and telephony network which guarantees complete vocal, data, fax and video connectivity, and points of access for mobile telephony and Internet access.

Another object of the present invention is to provide a telecommunications and telephony network which enables the telephone operator to have complete control over the costs of the calls and over the telephone traffic generated by the users in international roaming, also guaranteeing the possibility of offering pre-paid telephone traffic and prices which are lower than those applicable hitherto.

A further object of the present invention is to provide a telecommunications and telephony network which makes it possible to obtain new financial inputs, both for the telephone operators and for the companies which are partners of the roaming operators.

Another object of the invention consists of providing a telecommunications and telephony network which uses techniques and components which are normally used in the conventional systems for transport of signals, and which has a substantially simple design and is economical to implement as an investment, owing to the advantages obtained.

These and other advantages according to the present invention are achieved by providing a telecommunications and telephony network, as described in claim 1, to which reference is made for the sake of brevity.

Other characteristics of the present invention are also defined in the successive claims. Advantageously, the network according to the invention is designed for use within the context of fixed telephony and/or video telephony, however without excluding mobile/fixed integration.

In particular, for the connection of the "last mile", it uses a bidirectional satellite radio bridge and a bidirectional satellite station/site which is connected by means of the wiring of the building vertically to an IP video telephone.

Unlike the conventional systems which are operative at present, the telecommunications and telephony system according to the invention collects the traffic by providing, depending on the cases and also in the specific case of fixed telephony, only small lengths of copper cable from the client base to the roof itself of the client base, where there is present a first network device with collection functions; the client base can therefore be reached directly by radio by means of devices which communicate between the client baseband the roof of the base, as in the case of mobile or cordless telephone devices; the transport is carried out by bidirectional satellite radio bridges.

The network according to the invention also transports broad-band integrated services digitally via satellite, directly to the client base, as well as the normal fixed telephony services.

Use is also made of low emission power levels (normally lower than 20 W for each individual device); which however, owing to the orientation of the antenna, which is disposed at an elevation of 30-40°, create very low levels of electromagnetic field on the horizontal plane.

This involves use of a considerable number of stations, which however can be self-supplied, by means of the installation of small solar panels (owing to the low power levels used).

The fact of using low power levels has another clear advantage, consisting of the very low level of electromagnetic pollution.

The system also guarantees vocal, data, fax and video connectivity, and points of access for mobile telephony, Internet access and video telephony.

The central core of the network, which guarantees connectivity between the various local exchanges and local residents' exchanges, is based on an IP (Internet Protocol) network structure, whereas at local level, the user has standard telephone numeration available in order to access the service.

At the level of the local exchange, there is transformation, which is transparent to the user, of routing based on standard telephone numeration, into routing based on the IP protocol, and similarly transformation of the digital or analogue signal (which contains the vocal, fax, data etc information), into data packages which are based on the IP protocol; in addition, in order to guarantee greater connectivity between the various resources, at a lower cost than in the known solutions, algorithms for compression of the information are applied.

As previously stated, the local user accesses the local telephone exchanges by means of bidirectional satellite radio bridges or stations/site; at the level of the local exchange, the telephonic flows obtained from various local radio bridges are incorporated, compressed and digitised, such that they can be transmitted on a network which is based on IP protocol, produced by means of connection on bidirectional satellite radio bridges, for connection at the level of local residents (between district exchanges), and with a satellite radio carrier, or using other technologies, for connection between different towns.

Finally, the system according to the invention provides a fixed telephony network, comprising various contents with added value, which is completely independent from the conventional service companies, and from the physical carriers which are used as standard by the latter for the creation of a complete telephony network.

Connectivity is guaranteed completely between users of the same network in a local, local resident, regional, national and supranational environment, as well as between users of networks of other service companies.

The system according to the invention can also control all the flows of information and data which are currently available on conventional telephony networks (local calls, fax, data and video transmission, video telephony and video conferences, Internet access, points of access for mobile telephony).

In particular, the video telephony systems are supported by appropriate devices which use the IP protocol at connection level, such that the video telephony itself can occupy a band of between 128 Kbit/s and 384 Kbit/s.

The system in question also transports a plurality of services in a single duct, thus enabling the control operator to avoid having to use a plurality of physical means in order to offer different services.

Finally, the system can be installed quickly and easily, since it does not require excavation work, with all the consequent potential problems (permits, passage through historic town centres, any damage, etc), it is more economical than the conventional systems, owing to the limited power levels of the devices and the relative simplicity of the network architecture, and has considerable flexibility and simplicity of use for the network operator, which can also control and manage the entire system from several points, or from a single national node.

Further characteristics and advantages of a telecommunications and telephony network according to the present invention will become more apparent from the following description, provided by way of non-limiting example with reference to the attached drawings, in which:

FIG. 4 illustrates schematically an example of global connection to the various local accesses of a telecommunications and telephony network for local residents, according to the present invention.

Figure 1:
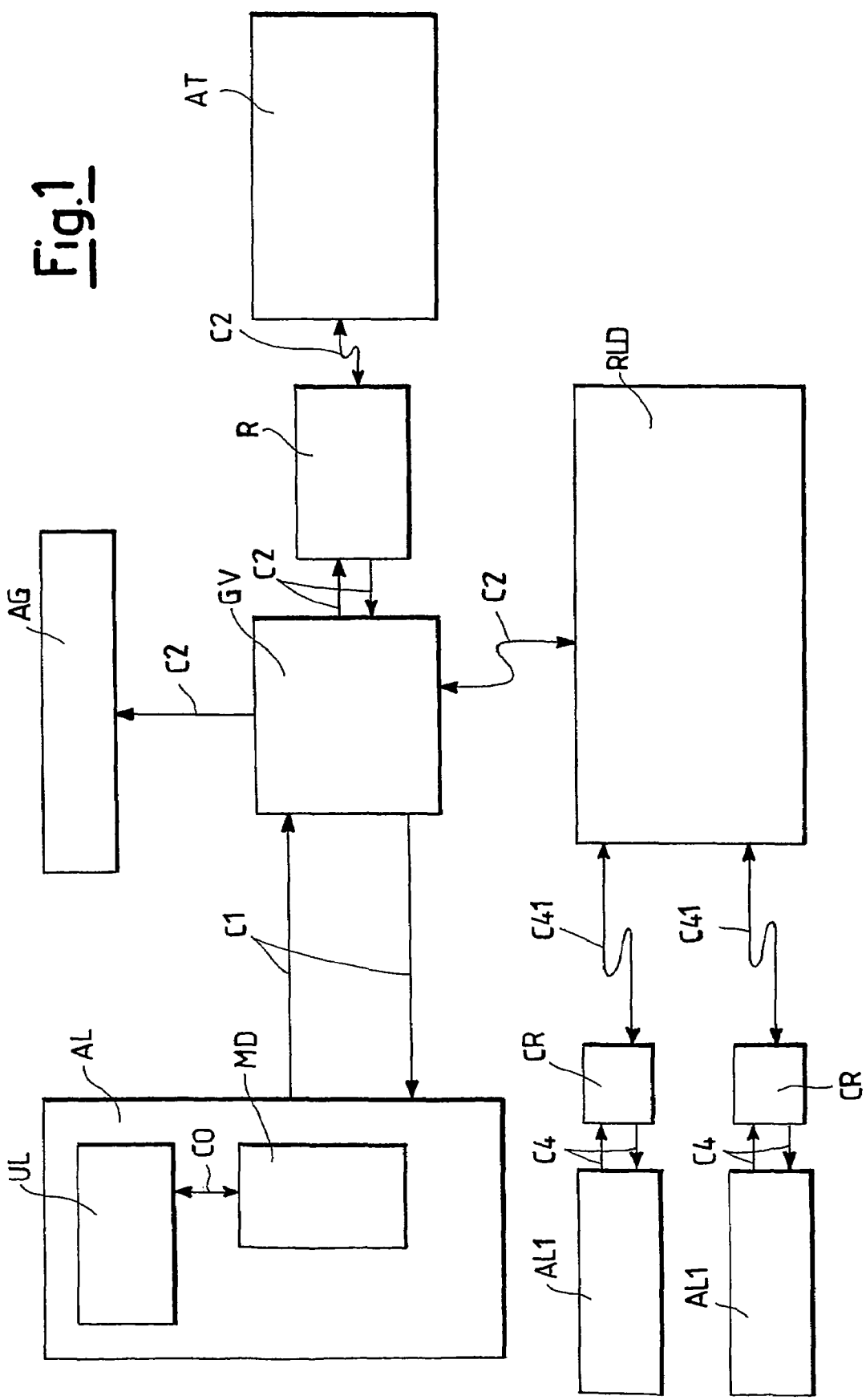
FIG. 1 illustrates schematically a method according to the present invention, for connection of local accesses of fixed telephone devices, to a telecommunications and telephony network.

With particular reference to FIG. 1, it can be seen that the architecture of the network according to the invention is based on different levels, subdivided hierarchically, wherein the lowest levels comprise a first series of connections, indicated as C0, C1, of the local users UL of a local access AL to local centralising devices MD, and of the said local centralising devices MD to the local exchange GV: these connections are formed mainly by means of data flows of the type E1, at 2 Mbit at least.

The highest levels, relative to the connections C2 between the local exchanges GV, the local residents' exchanges, regional and national exchanges, and the nodes for access to the networks of other service companies AG, are connected by means of data flows which are organised according to the protocol TCP/IP.

At the highest levels, the fixed telephony network AT according to the invention is based on a conventional IP (Internet Protocol) structure, on which the standard telephony is transformed into telephony of the "Over IP" type.

One of the main innovative aspects of the network which is the subject of the present invention is the use, in most or all of the connections, of connections C1, C2 of the bidirectional satellite type, which are diversified according to the level of the network through which the signal is passing.

The only portion of connection based on physical carriers which are not of the radio type, is the connection, indicated as C0, between the final user UL (telephone or analogue modem) and the local centralising device MD, which consists of a multiplexer/demultiplexer, which generates a flow E1 with 2 Mbits, standard G.703/HDB3; in fact, this connection is normally formed with cabling by means of a telephone pair or optical fibres.

The local centralising device MD is normally always present in the same stable unit as the final user, and can incorporate up to a minimum of 30 telephone calls simultaneously.

If required, the final user can be connected to the multiplexer by means of one or a plurality of lines, or can activate a connection of the ISDN type, with a minimum of 64 Kb, or a variable or fixed band data connection, according to the capacity required at that moment for transport of the video, audio or data flow.

As an alternative to the conventional fixed telephony connection, it is possible in addition to create a series of points of input (local accesses indicated by AL1) to the telephony network AT, according to the invention, for telephone devices of the cellular or cordless type TC.

Usually, the cover for cordless or mobile telephone devices TC guarantees an environment which is restricted to the building or to the area adjacent to the building itself, although greater cover is not excluded if the area of the final user is well covered by radio cells CR.

Figure 2:
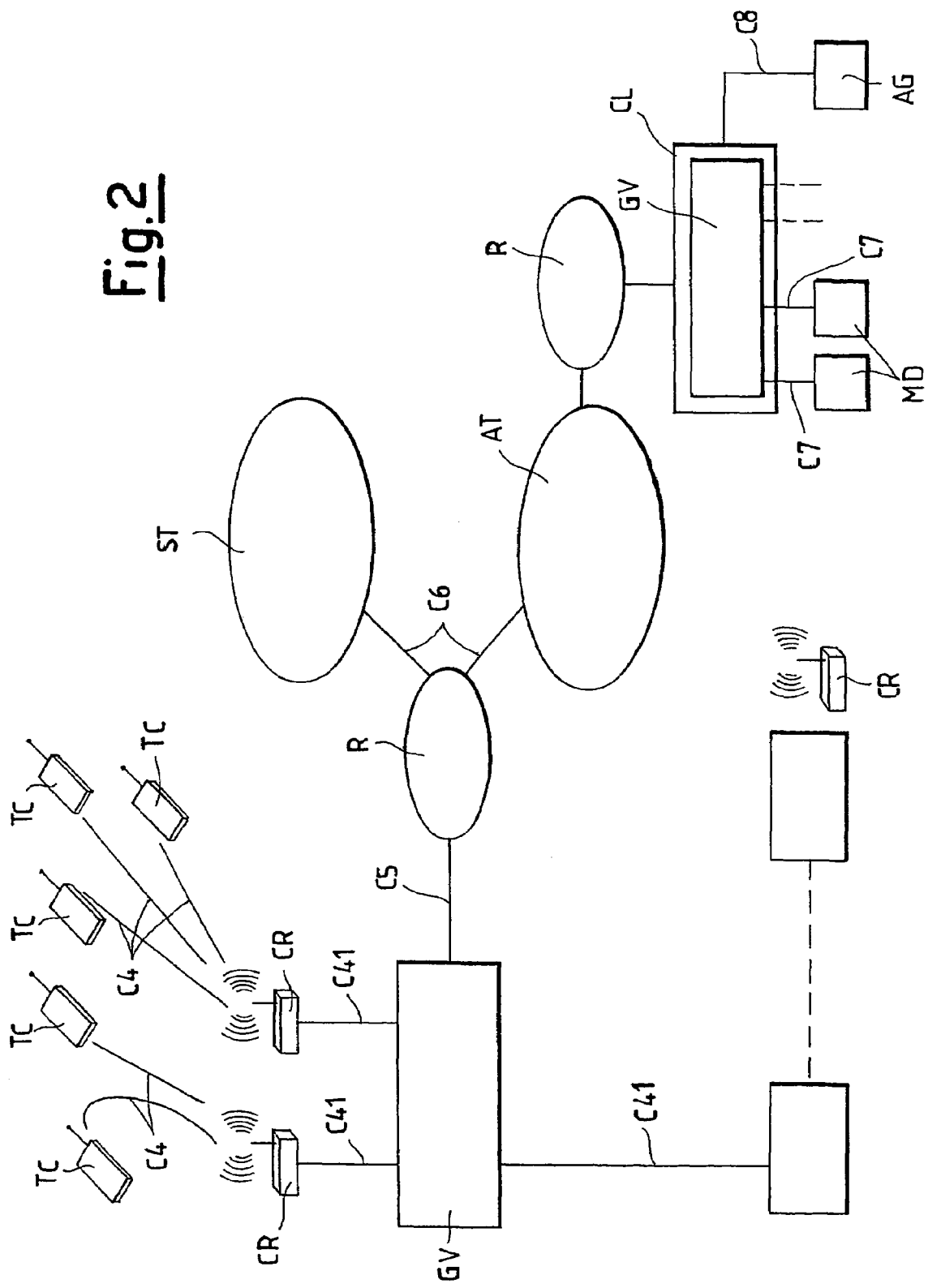
FIG. 2 represents schematically a method according to the present invention, for connection of local accesses of cellular telephone devices to a telecommunications and telephony network.

The signals C4 received by the radio cells CR are in digital format, and are obtained from the mobile telephone devices TC; in this respect, see also the diagram in FIG. 2.

At the output of the cells CR, there is present a digital flow, indicated as C41, of standard type G.703/HDB3, with 2 Mbits.

One or a plurality of flows with 2 Mbits, of the type indicated as C41 and obtained from the cells CR, are sent to a compression and conversion device GV (gateway), which compresses and converts signals C41 into IP protocol.

At the output of the device GV, the 2 Mbit signal in IP, which is indicated as C5 in FIG. 2, is sent to a router R; the router R addresses the various signal packages in the required directions, in accordance with a configuration which is decided by the network service company.

Thus, downstream from the device R, the signal C6 can, for example, equally well be conveyed to a bidirectional satellite connection ST, or it can be transmitted to another point on the telephony network AT.

The connection between the different points of the network AT can take place on a single-hop basis (direct connection between the local centralising device MD and the local exchange) or on a multi-hop basis (connection carried out by means of intermediate repeaters between the local centralising device MD and the local exchange).

Leading to the local exchange CL there are one or a plurality of data flows E1, with 2 Mbit of standard G.703, indicated as C7 in FIG. 2, which are obtained from one or a plurality of local centralising devices MD, or from accesses to the networks of other service companies AG, based on data flows of standard SS7 (indicated as C8 in FIG. 2), single connections with local users, by means of pairs or optical fibres, and points of access for mobile telephony.

At the level of the local exchange CL, the standard telephone flow is converted into a flow according to the IP protocol, and the highest levels of the network AT, which guarantee the connection between the local exchanges CL, the exchanges for local residents, regional and national exchanges, and the nodes C2 for access to the networks of other service companies, are organised as a standard network of the type with IP protocol.

In order to implement this type of telephony, it is thus necessary to transform the information, whether it is in the form of voice, fax, video or data, in whatever format it reaches the local exchange CL (flow E1 with 2 Mbits, standard G.703, single digital or analogue signal, SS7 data flow) into a flow of homogeneous data, such as to be transported on a network with a package based on the standard protocol TCP/IP (Internet standard protocol); in addition, it is necessary to transform the process of routing telephone calls based on telephone numeration specific to the telephone networks, by replacing the standard telephone numeration, at network level, by addresses according to the IP protocol.

This process is altogether transparent at levels of local use, and is implemented by means of an applicative programmed for control of the network.

The device which controls the conversion is the conversion and compression device GV, which in practice consists of a multi-protocol gateway device.

Each local exchange CL is equipped with at least one device for conversion and compression GV, which thus processes different types of inputs (for example one or a plurality of flows E1 G.703, one or a plurality of single digital or analogue signals in multi-protocol, whilst distinguishing one from another, or one or a plurality of data flows SS7), and transforms them into data packages based on the standard protocol TCP/IP.

At the same time, it converts the standard numeration into addressing of the IP type, and controls the transmission of correctly addressed packages on the high hierarchical levels of the AT network, in IP protocol.

The conversion device GV also permits the opposite passage, and thus conversion of the data flows in IP standard (high hierarchical levels of the AT network) into the data flows sent to the local user, or to users of networks of other service companies (transformation into flow E1, standard G.703, into a single digital or analogue signal, into SS7 data flows, etc).

In addition, since it can obtain digital data, by implementing algorithms for compression both of the vocal information and of the addressing in the IP protocol, the device GV makes it possible to obtain a reduction of the programmable and variable data flows which is up to 10 times the nominal level (compression ratio of 10:1). This involves a further saving in infrastructures, leading to telephone charges which are far more advantageous for the user.

At the level of the local exchange CL, the local residents' exchange and the regional exchange, control of telephone charges is also provided, in the sense that each exchange is autonomous in calculating the charges to the users which are directly connected to it; the bill may or may not then be sent to one or a plurality of accounting collection centres, which subsequently control and collect the payments.

To summarise, the device GV permits transformation of the standard telephone flow which enters a data flow in compressed IP protocol, permits transformation of the process of standard telephone routing into IP protocol routing, and guarantees control of the telephone charges, and transformation of the flow of data in compressed IP protocol into a standard telephone flow output.

The data flows in IP protocol which are output from the conversion devices GV must be routed on a network which is based on IP protocol, and thus, each device GV is connected directly to a local routing device R in IP protocol, by means of a 10/100 data flow BaseT.

In the network topology in IP protocol, the device GV represents a gateway device for local access or access outside the network AT.

The telecommunications and telephony network AT according to the invention, at IP protocol level, consists of various hierarchical levels, which are subdivided into a local network (district), local residents' network, regional network, national network, and supranational network.

Routing within the network AT is controlled directly by the dedicated devices, indicated as R, in IP protocol, which are connected to the local compression devices GV, or to satellite routing devices RS, or to radio bridges PR, which permit interconnection between networks RLC at the level of local residents (in this respect see the diagram in FIG. 3); in particular, at the level of local residents, the data flow output from the routing device R is sent to the other routing devices R, mainly via a connection, indicated as RLD, with bidirectional satellite radio bridge technology, in frequency bands which are dependent on the country in which the network AT is operating (in this case also, the connection can take place directly or by means of intermediate repeaters).

At the level beyond that of local residents (connections between different towns or regional locations), the connection can also take place with conventional systems, such as optical fibres, coaxial cables, radio bridges or the like, but it takes place mainly by means of a satellite connection node ST (geostationary satellite), wherein the routing device R is connected to the satellite transmission device with a data flow of 10/100 BaseT.

The satellite connection ST has a capacity which is variable according to the traffic required by the network AT that moment, starting from a minimum of 64 Kbits; for greater traffic demands it is possible to use a plurality of segments with a spatial capacity, placing them in parallel.

Taking into consideration that the network AT must form a private telephone network, in practice it is possible to structure a hierarchical level, which, in a national reference network node, has access to the outside world; in this case, the access to the outside world guarantees the possibility that a user of the network AT can reach a user who is not connected to the network AT, and thus, a client of another telephony operator.

Starting from the national reference network node, a structure on a plurality of hierarchical levels is produced, which can reach the individual user of the network AT in every geographical area of different countries.

At the level of the national reference node, in addition, there is control of the connections between the regional nodes of the network AT, as well as control of the telephone charges; the connection between the national reference node and the regional nodes is provided by means of a satellite network VSAT, or more generally by means of a satelite network which operates digitally, and is preferably of the geostationary type.

The regional node of the network AT guarantees the connection between the various local resident nodes located in the region; at this level, transit takes place of all the calls between users of the network AT, which are directed to local resident areas in the same region, other than the local resident area of origin, or those which are directed to other regions or to other telephone operators.

The connection between the regional node and the local resident nodes is always produced digitally, by means of bidirectional satellite radio, transmission, or, if this is not possible, by means of communication via optical fibres.

A regional router routes the communications between the various local residents' networks RLC, or creates the connection with the other regional networks by means of the satellite network VSAT; all the signals are of the digital type.

Figure 3:
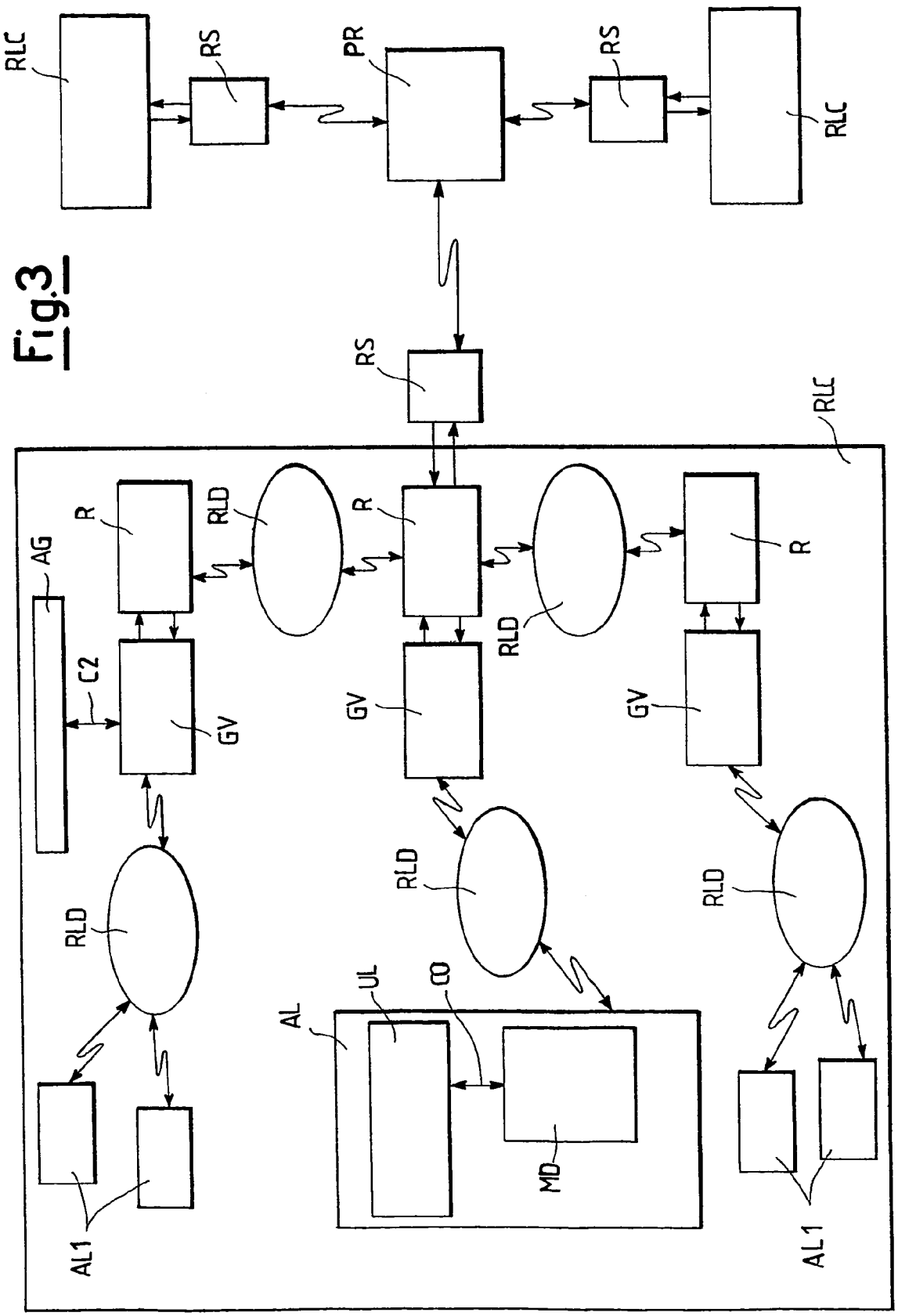
FIG. 3 represents a block diagram of a telecommunications and telephony network according to the invention, connected to telephone networks for local residents.

The local residents' network, which is indicated as RLC in FIG. 3, assures the telephone connections or calls between users of the network AT in the same town, which are controlled locally by means of the structure schematised in FIG. 4.

Each town is subdivided into geographical areas with variable dimensions, with a maximum radius of approximately 3 Km, known as "sub-local resident areas"; each individual "sub-local resident" area is in fact a local point of access AL, AL1 to the network AT in IP protocol, since, in fact, it is at this level that the standard telephony calls are transformed into IP protocol telephony.

Each individual area is provided with a conversion and compression device GV, which guarantees the access and initial routing on the network AT; taking into consideration the compression properties of the gateway devices GV, it is possible to connect to each access node AL, AL1, up to 300 simultaneous standard vocal telephone connections or data connections, each of which is up to 2 Mbits.

The connection between the access node AL, AL1 and the standard telephony systems (of the PABX type) is provided by means of bidirectional satellite radio bridges or via optical fibres.

In order to assure the connection between the access nodes AL, AL1, each access node AL, AL1 is provided with a routing device; in addition, an access node AL, AL1 also provides the connectivity with the regional node, in order to permit the connection between the individual local residents' networks.

The physical connection between the various access nodes AL, AL1, is provided with bidirectional satellite digital radio bridges or on optical fibres, whereas, the network topology must be designed locally in order to minimise the costs, whilst maximising the local resident cover.

Finally, the use of the routing devices assures redundancy of the network structures.

The description provided makes apparent the characteristics and advantages of the telecommunication and telephony network which is the subject of the present invention.

To summarise, these consist of:
scalability, i.e. enlargement of the radio band, simply by adding one or a plurality of bidirectional satellite radio bridges and the corresponding antenna system, on every site where this is necessary;

very low volume of power emitted by the radio systems, which can thus also be self-supplied by means of solar panels;

increased services offered on a single physical carrier, in comparison with conventional telecommunications systems;

ease and speed of installation, and high level of economic viability in production and use;

possibility of transporting any digital signal, and of carrying out A/D and D/A conversions;

possibility of compressing the telephone signal, with consequent optimisation of the network resources;

complete control of the network from a single location or national node;

complete integration between fixed telephony and mobile telephony;

simplicity in implementation of the connection between the Radio Base Station (TBS or RBS) and Control Station (DXT or BSC), which eliminates the difficulties caused by laying cables for implementation of the flows at 2 Mbit/s;

possibility of using simply and quickly Radio Base Stations (TBS or RBS) to be located at the appropriate time in places where there is an immediate need for cover, such as putting into service a Radio Station in order to increase the number of carriers in the event of festivals, conventions, etc., and possibility of providing cover by means of transportable Radio Stations in locations which have sustained disasters of any type; and simple interfaceability of the system with the pre-existing systems.

Finally, it is apparent that many variants can be made to the telecommunications and telephony network in question, without departing from the principles of novelty which are inherent in the inventive concept, and it is also apparent that, in the practical implementation of the invention, the details illustrated can be used in any form, according to requirements, and can be replaced by others which are technically equivalent.

The invention claimed is:

1. Telecommunications and telephony network (AT) for controlling (TC) peripheral devices at a customer premises, comprising at least one local area network, at least one local residents' network (RLC), at least one regional network, at least one national network and a central network, said telecommunications and telephony network (AT) being provided for delivering signals and data between a plurality of local accesses (AL, AL1), including local users (UL), and a plurality of network accesses (AG), through local exchanges (CL, CR), each of said local exchanges (CL, CR) including a multi-protocol gateway device (GV) for video and audio signals and data compression and conversion into IP packets bearing IP telephony data flow or data flow from the Internet and a local routing device (R) for routing said IP telephony data flow or data flow from the Internet, wherein said local users (UL) of each local access (AL, AL1) are connected to local centralizing devices (MD) through first linking means (CO) for flowing data and signals, and said local centralizing devices (MD) are in turn connected to said local exchanges (CL, CR) through second linking means (C1, C4) for flowing data and signals, while said local exchanges (CL, CR) are connected to said networks accesses (AG) through third linking means (C2, C41) for flowing data and signals, characterized in that at least said second (C1, C4) and said third linking means (C2, (C41) are constituted by bidirectional satellite radio bridges (RLD, ST), wherein each bi-directional satellite radio bridge comprises a receiving/transmitting device provided at each one of the local access (AL, AL1), said network further characterized in that the first linking means (CO) are constituted by physical cables, including telephone twisted pairs or optical fibers.

2. Telecommunications and telephony network (AT) as claimed in claim 1, characterized in that said local routing devices (R) are connected to satellite routing devices (RS) or to radio bridges (PR), said radio bridges (PR) being able to provide connection between local residents' networks (RLC).

3. Telecommunications and telephony network (AT) as claimed in claim 1, characterized in that each regional network is connected to the relative local residents' network (RLC) by means of a digital bidirectional satellite radio transmission or by means of communication via optical fibers.

4. Telecommunications and telephony network (AT) for controlling (TC) peripheral devices at a customer premises, comprising at least one local area network, at least one local residents' network (RLC), at least one regional network, at least one national network and a central network, said telecommunications and telephony network (AT) being provided for delivering signals and data between a plurality of local accesses (AL, AL1), including local users (UL), and a plurality of networks accesses (AG), through local exchanges (CL, CR), each of said local exchanges (CL, CR) including a multi-protocol gateway device (GV) for video and audio signals and data compression and conversion into IP packets bearing IP telephony data flow or data flow from the Internet and a local routing device (R) for routing said IP telephony data flow or data flow from the Internet, wherein said local users (UL) of each local access (AL, AL1) are connected to local centralizing devices (MD) through first linking means (CO) for flowing data and signals, and said local centralizing devices (MD) are in turn connected to said local exchanges (CL, CR) through second linking means (C1, C4) for flowing data and signals, while said local exchanges (CL, CR) are connected to said networks accesses (AG) through third linking means (C2, C41) for flowing data and signals, characterized in that at least said second (C1, C4) and said third linking means (C2, C41) are constituted by bidirectional satellite radio bridges (RLD, ST), wherein each bi-directional satellite radio bridge comprises a receiving/transmitting device provided at each one of the local access (AL, AL1), said network further characterized in that the first linking means (CO) are constituted by physical cables.

5. Telecommunications and telephony network (AT) for controlling (TC) peripheral devices at a customer premises, comprising at least one local area network, at least one local residents' network (RLC), at least one regional network, at least one national network and a central network, said telecommunications and telephony network (AT) being provided for delivering signals and data between a plurality of local accesses (AL, AL1), including local users (UL), and a plurality of networks accesses (AG), through local exchanges (CL, CR), each of said local exchanges (CL, CR) including a multi-protocol gateway device (GV) for video and audio signals and data compression and conversion into IP packets bearing IP telephony data flow or data flow from the Internet and a local routing device (R) for routing said IP telephony data flow or data flow from the Internet, wherein said local users (UL) of each local access (AL, AL1) are connected to local centralizing devices (MD) through first linking means (CO) for flowing data and signals, and said local centralizing devices (MD) are in turn connected to said local exchanges (CL, CR) through second linking means (C2, C41) for flowing data and signals, while said local exchanges (CL, CR) are connected to said networks accesses (AG) through third linking means (C2, C41) for flowing data and signals, characterized in that at least said second (C1, C4) and said third linking means (C2, C41) are constituted by bidirectional satellite radio bridges (RLD, ST), said bidirectional satellite radio bridges are further characterized in that they are low power consumption units, each low-power bidirectional satellite bridge being supplied power by means of a solar power system, wherein each bi-directional satellite radio bridge comprises a receiving/transmitting device provided at each one of the local access (AL, AL1) said network further characterized in that the first linking means (CO) are constituted by physical cables.

6. A telecommunications and telephony network (AT) as defined in claim 4 where the physical cables are selected from telephone twisted pairs and optical fibers.

7. A telecommunications and telephony network (AT) as defined in claim 5 where the physical cables are selected from telephone twisted pairs and optical fibers.

* * * * *